June 4, 1963  R. C. ZELLER  3,091,948
UNIVERSAL JOINT SEAL
Filed Feb. 5, 1962  2 Sheets-Sheet 1
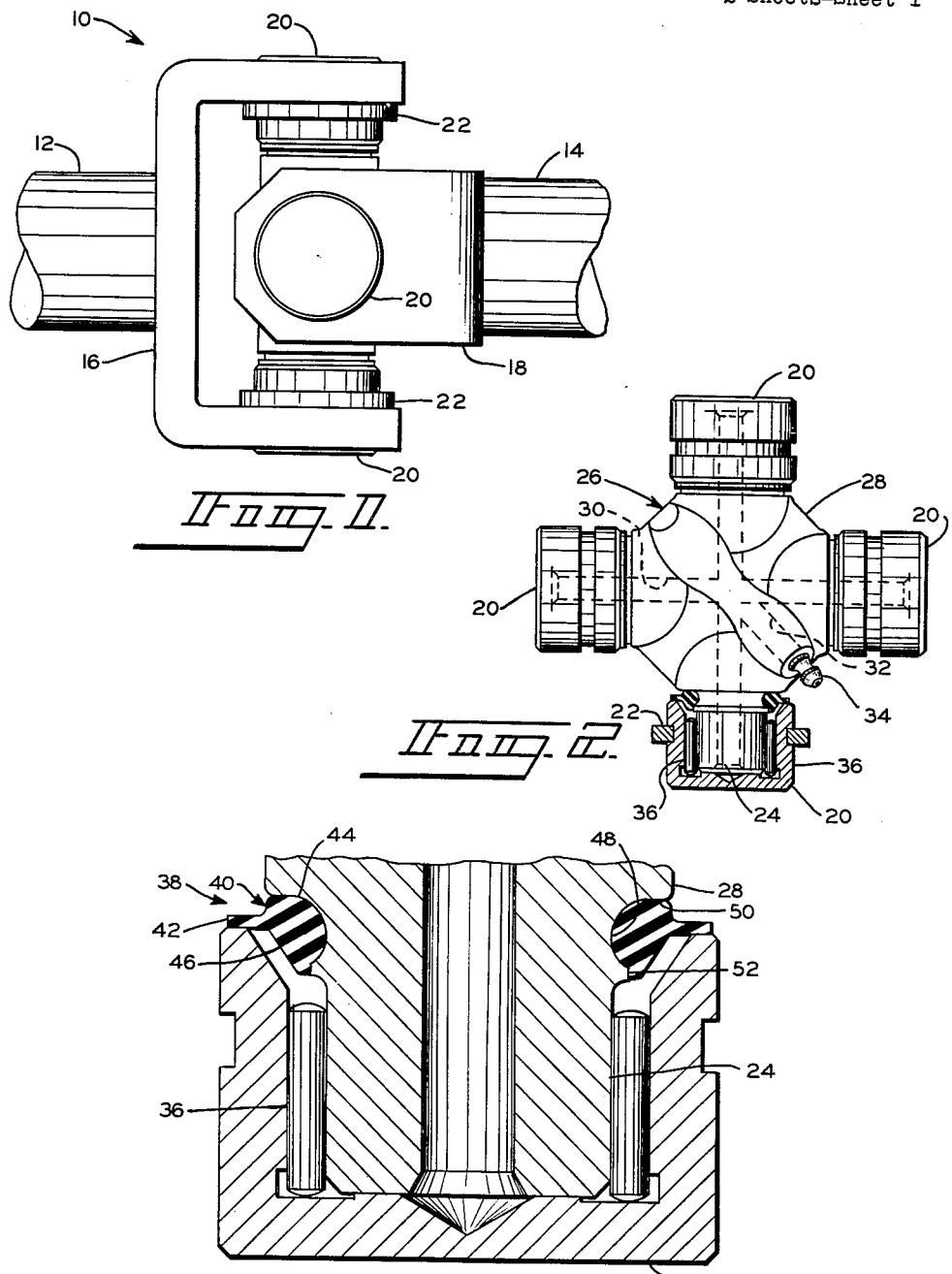
INVENTOR.
ROBERT C. ZELLER
BY
Owen & Owen
ATTORNEYS June 4, 1963  R. C. ZELLER  3,091,948
UNIVERSAL JOINT SEAL
Filed Feb. 5, 1962  2 Sheets-Sheet 2
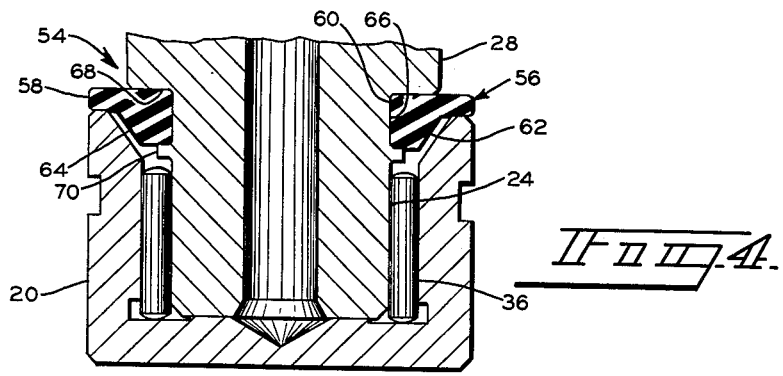
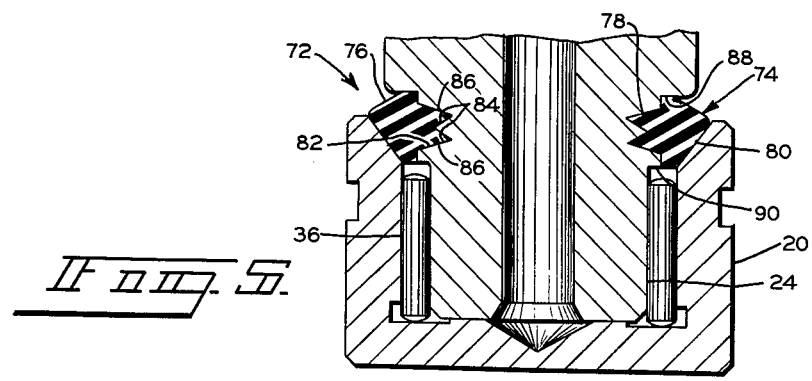
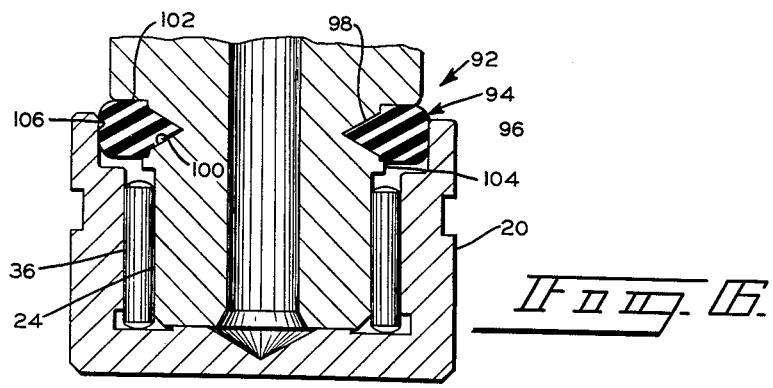
INVENTOR.
ROBERT C. ZELLER
BY
Owen + Owen
ATTORNEYS

United States Patent Office 3,091,948
Patented June 4, 1963

3,091,948
UNIVERSAL JOINT SEAL
Robert C. Zeller, Defiance, Ohio, assignor to The Zeller Corporation, Defiance, Ohio, a corporation of Ohio
Filed Feb. 5, 1962, Ser. No. 171,170
7 Claims. (Cl. 64—17)

This invention relates to a lubricant seal and more particularly to a lubricant seal for universal joints.

In recent years universal joints, particularly for passenger cars, are being more frequently provided with lubricant fittings so that the bearings thereof can be periodically lubricated. Heretofore, the bearings have been more or less permanently lubricated and usually are expected to remain so for the life of the car. As a consequence, the joints have frequently frozen because the lubricant has dried up or become excessively contaminated, often resulting in substantial damage to other components of the automobile drive system.

The present invention relates to an improved seal to retain lubricant in the bearing of a universal joint and yet to enable old lubricant to be flushed therefrom when new lubricant is added. The new seal is provided with an improved seat which prevents the seal from moving because of centrifugal force, thereby minimizing the chance for lubricant to be lost because of high rotational speeds. The seat further provides a retainer for the needle bearings or the like and also renders the components of the universal joint more easy to assemble.

It is, therefore, a principal object of the invention to provide an improved lubricant seal for bearings of universal joints, which seal has the advantages outlined above.

Other objects and advantages of the invention will be apparent from the following detailed description of preferred embodiments thereof, reference being made to the accompanying drawings, in which:

FIG. 1 is a view in elevation of an assembled universal joint embodying the principles of the invention;

FIG. 2 is an enlarged view in elevation of a cross member and bearing cups assembled therewith, with parts broken away and with parts in cross section;

FIG. 3 is a greatly enlarged, fragmentary view in cross section of a bearing seal, trunnion, and bearing cup shown in FIG. 2; and FIGS. 4–6 are greatly enlarged, fragmentary views in cross section of modified bearing seals.

Referring to the drawing, and more particularly to FIG. 1, a universal joint embodying the principles of the invention is indicated at 10 and connects driving and driven members 12 and 14 in the usual manner. The joint 10 includes two yokes 16 and 18 disposed at mutually perpendicular angles with bearing cups 20 held in end portions of the yokes 16 and 18 by means of retaining rings 22 or other suitable means.

The bearing cups 20 receive trunnions 24 of a cross member 26, the trunnions 24 extending outwardly from a body 28 of the cross member. The body 28 and the trunnions 24 are provided with lubrication passages 30 (FIG. 2) which communicate with a supply passage 32 connected to a grease fitting 34. The passages 30 enable grease to flow to the ends of the trunnions 24 and pass between the trunions and the bearing cups 20 to and around roller or needle bearings 36 disposed between the cups 20 and the trunnions 24. With this arrangement, the needle bearings 36 can be lubricated every time the automobile is lubricated, if desired, to minimize the possibility of the bearings drying out and the universal joint freezing. However, lubrication every 5000 miles is usually sufficient. Those portions of the universal joint 10 described to this point are basically known in the art and do not form a specific part of the present invention.

A resilient seal 38 is provided to seal off the annular opening between the bearing cup 20 and the cross member 26 to prevent lubricant from flowing out and dirt from entering. The seal 38 (see FIG. 3) includes a resilient sealing ring 40 having an annular, radially extending flap 42 and an annular seating or base portion 44 which presents a slanted or truncated conical surface 46 toward the bearing cup 20. The seating or base portion 44 is retained in an annular groove 48 with the normal relaxed diameter of the portion 44 being somewhat less than that of the groove 48 to provide a secure fit therein. The groove 48 is located between the body 28 and the trunnion 24 and is defined by a shoulder 50 of the body 28 and an annular ridge 52 toward the inner end of the trunnion 24. Pressure of the lubricant between the trunnion 24 and the bearing cup 20 which presses against the slanted surface 46 of the resilient ring 40 acts to urge the seating portion 44 into the groove 48 and does not tend to move it out of the groove as in presently known constructions. The groove 48 has a smaller radius at the lower portion toward the end of the trunnion 24 so that it will better resist movement of the ring 44 in that direction caused by the cross member 26 rotating at high speeds. The annular ridge 52 not only helps to form the groove 48 but also serves as a retainer to maintain the roller bearings 36 in position and to prevent them from possibly contacting and destroying the ring 40 during relative movement of the trunnion 24 and the cup 20. In addition, the ridge 52 also tends to keep the lubricant away from the groove 48 and minimizes the chance that the lubricant will ooze between the ring 40 and the groove 48, as has been a relatively, common occurrence with some known universal joints.

The thin annular flap 42, by extending substantially in a plane perpendicular to the longitudinal extent of its associated one of the trunnions 24, enables the cup 20 to be assembled very easily with the trunnion 24 without the possibility of the flap being accidentally tucked inside the edge of the cup 20, as has been possible with seals heretofore known. However, the flap 42 is pressed securely against the annular edge of the cup 20 during rotation of the universal joint 10 to maintain an effective and positive seal therewith. At the same time the seal flap 42 offers very little resistance to the flow of lubricant outwardly of the cup as will happen each time the universal joint is lubricated.

The bearing seal of FIG. 4 is indicated at 54. The seal 54 includes a resilient sealing ring 56 having an annular, outwardly extending portion or flap 58 and an annular seating or base portion 60 which presents a slanted surface 62 toward the bearing cup 20. While the flap 58 is considerably heavier than the flap 42 of the ring 40, it acts similarly thereto in preventing entrance of dirt into the bearing but enabling the flow of lubricant outwardly. In this instance, the inner surface of the seating portion 60 is of a generally square U-shaped configuration and is retained in a groove 66 which also is of similar shape. As in the prior embodiment, the ring 56 has a relaxed diameter slightly less than that of the groove 66 to provide a secure fit therein. The groove 66 is located between the body 28 and the trunnion 24 and is defined by a shoulder 68 of the body 28 and an annular ridge 70 positioned toward the inner end of the trunnion 24. The shape of the seating portion 60 and of the groove 66 enables a secure fit to be attained for the ring 56. Pressure of the lubricant between the trunnion 24 and the bearing cup 20 also is applied to the slanted surface 64 which again tends to urge the seating portion 60 into the groove 66. This pressure is only an added safety factor and is not essential, however. In addition to forming the groove 66, the annular ridge 70 serves as a retainer for the roller bearings and also keeps the lubricant away from the seating portion 60 and the groove 66.

Referring to FIG. 5, a further modified resilient seal is indicated at 72 and includes a resilient sealing ring 74 which has an annular, outwardly extending portion 76 and an annular seating or base portion 78. The ring also has a slanted surface 80 which faces the bearing cup 20 with at least a portion thereof engaging an annular edge portion of the cup 20. The seating portion 78 in this instance is retained in an annular groove 82 with the relaxed diameter of the ring again being somewhat less than that of the groove 82 to provide a secure fit therein. The groove 82 actually is provided with two smaller valleys 84 therein which cooperate with two annular, inwardly extending projections 86 of the base portion 78 to provide an even more secure fit. The groove 82 is located between the body 28 and the trunnion 24 and is defined by a shoulder 88 of the body 28 and an annular ridge 90 on the trunnion 24. Again, the ridge not only helps to form the groove 82 but also serves as a retainer for the roller bearings and helps to keep lubricant from between the ring 74 and the groove 82.

A further modified resilient seal 92 of FIG. 6 includes a resilient sealing ring 94 having an annular, outwardly extending portion 96 and an annular seating or base portion 98. The seating portion 98 is retained in an annular, V-shaped groove 100, with the relaxed diameter of the portion 98 being somewhat less than that of the groove 100 to provide a secure fit therein. The groove 100 is located between the body 28 and the trunnion 24 and is defined by a shoulder 102 of the body 28 and an annular ridge 104 on the trunnion 24. Pressure of the lubricant between the trunnion 24 and the cup 20 presses against an outer surface 106 of the ring 94 to urge the seating portion 98 into the groove 100. As before, the annular ridge 104 also serves as a retainer for the roller bearings and tends to keep the lubricant from entering between the groove 100 and the ring 98.

Various modifications of the above described embodiment of the invention will be apparent to those skilled in the art and it is to be understood that such modifications will not depart from the scope of the invention, if within the spirit and tenor of the accompanying claims.

What I claim is:

1. A universal joint comprising a cross member having a body and a trunnion extending outwardly therefrom and terminating in an end spaced from said body, a bearing cup encompassing said trunnion, bearing means between said trunnion and said cup, said member having an annular groove located adjacent the junction of said body and said trunnion and near an annular edge portion of said cup, said cross member having an annular ridge contiguous with said groove on the side thereof toward the end of said trunnion, a resilient sealing member comprising an annular base seating portion seated in said groove and an outwardly extending portion integral with said seating portion and extending at least to and in contact with the edge portion of said bearing cup, said resilient sealing member having a surface which, when subjected to lubricant pressure, urges said seating portion into said groove, and means for supplying lubricant through said trunnion to said bearing means in said bearing cup.

2. A universal joint according to claim 1 wherein said surface is slanted toward said bearing cup 3. A universal joint comprising a cross member having a body and a trunnion extending outwardly therefrom and terminating in an end spaced from said body, a bearing cup encompassing said trunnion, bearing means between said trunnion and said cup, said member having an annular groove located adjacent the junction of said body and said trunnion and near an annular edge of said cup, said groove having a diameter at least as large as the diameter of said trunnion, said cross member having an annular ridge contiguous with said groove on the side thereof toward the end of said trunnion, a resilient sealing member comprising an annular base seating portion seated in said groove and a relatively thin, outwardly extending portion integral with said seating portion and extending at least to and in contact with the edge portion of said bearing cup, and means for supplying lubricant through said trunnion to said bearing means in said bearing cup.

4. A universal joint according to claim 3 wherein said groove has a generally semi-circular cross section.

5. A universal joint according to claim 3 wherein said groove has a generally square U-shaped cross section.

6. A universal joint comprising a cross member having a body and a trunnion extending outwardly therefrom and terminating in an end spaced from said body, a bearing cup encompassing said trunnion, bearing means between said trunnion and said cup, said member having an annular groove located adjacent the junction of said body and said trunnion and near an annular edge portion of said cup, said annular groove having a semi-circular cross section and having a diameter at least as large as the diameter of said trunnion, said cross member having an annular ridge contiguous with said groove on the side thereof toward the end of said trunnion, a resilient sealing member comprising an annular base seating portion seated in said groove and a thin, continuous, annular flap extending outwardly from said base portion in a plane perpendicular to the longitudinal extent of said trunnion and extending at least to and in contact with the annular edge portion of said bearing cup, said resilient sealing member having a truncated conical surface on the side of said flap toward the end of said trunnion and tapering toward the end of said trunnion, and means for supplying lubricant through said trunnion to said bearing means in said bearing cup.

7. A universal joint comprising a cross member having a body and a trunnion extending outwardly therefrom and terminating in an end spaced from said body, a bearing cup encompassing said trunnion, bearing means between said trunnion and said cup, said member having an annular groove located adjacent the junction of said body and said trunnion and near an annular edge of said cup, said cross member having an annular ridge contiguous with said groove on the side thereof toward the end of said trunnion, a resilient sealing member comprising an annular base seating portion seated in said groove and a continuous, annular flap extending radially outwardly from said base portion in a plane perpendicular to the longitudinal extent of said trunnion and extending at least to and in contact with the annular edge of said bearing cup, and means for supplying lubricant through said trunnion to said bearing means in said bearing cup with pressure of the lubricant urging said seating portion further into said groove and tending to urge said annular flap away from the edge of said bearing cup.

References Cited in the file of this patent

UNITED STATES PATENTS

| | | |
|---|---|---|
| 771,637 | Hoffman | Oct. 4, 1904 |
| 2,338,169 | Dunn | Jan. 4, 1944 |
| 2,427,449 | Dunn | Sept. 16, 1947 |
| 2,896,432 | Hempel | July 28, 1959 |
| 2,908,536 | Dickey | Oct. 13, 1959 |
| 2,916,896 | Miller | Dec. 15, 1959 |

FOREIGN PATENTS

| | | |
|---|---|---|
| 692,992 | France | Aug. 11, 1930 |